(12) United States Patent
Storb et al.

(10) Patent No.: US 7,779,526 B2
(45) Date of Patent: Aug. 24, 2010

(54) METHOD FOR THE PRODUCTION OF A COLLECTING LINE FOR DETECTING AND LOCATING AN AGENT DISCHARGING INTO THE ENVIRONMENT OF THE COLLECTING LINE IN CASE OF LEAKAGE

(75) Inventors: Karl-Heinz Storb, Vestenbergsgreuth (DE); Arno Balthasar, Nürnberg (DE); Jan Zach, Erlangen (DE); Walter Knoblach, Forchheim (DE); Hans-Joachim Wittmann, Bubenreuth (DE)

(73) Assignee: AREVA NP GmbH, Erlangen (DE)

( * ) Notice: Subject to any disclaimer, the term of this patent is extended or adjusted under 35 U.S.C. 154(b) by 0 days.

(21) Appl. No.: 12/464,132

(22) Filed: May 12, 2009

(65) Prior Publication Data

US 2009/0217504 A1    Sep. 3, 2009

Related U.S. Application Data

(63) Continuation of application No. PCT/EP2008/000269, filed on Jan. 16, 2008.

(30) Foreign Application Priority Data

Feb. 6, 2007   (DE) ................. 10 2007 005 693

(51) Int. Cl.
*B23P 11/02* (2006.01)
(52) U.S. Cl. .......................... 29/450
(58) Field of Classification Search .......... 29/450, 29/407.05, 428, 512, 508, 507, 506, 743, 29/235, 237, 282; 73/40.7, 864.81, 40.5 R
See application file for complete search history.

(56) References Cited

U.S. PATENT DOCUMENTS 3,977,233 A   8/1976   Issel
4,735,095 A   4/1988   Issel (Continued)

FOREIGN PATENT DOCUMENTS

DE       2431907 A1       1/1976

(Continued)

OTHER PUBLICATIONS

International Search Report dated Apr. 21, 2008.

*Primary Examiner*—John C Hong
(74) *Attorney, Agent, or Firm*—Laurence A. Greenberg; Werner H. Stemer; Ralph E. Locher

(57) ABSTRACT

A method for producing a collecting line, and a collecting line produced according to the method is provided for detecting and locating an agent discharging into the environment of the collecting line in case of leakage. Such a collecting line has a carrier pipe, the wall of which is equipped with openings that are sealed by an elastic material that is permeable for the agent. Accordingly, a hose made of the permeable elastic material, the inside diameter of which is smaller than the outside diameter of the carrier pipe, is elastically expanded by creating a pressure difference between the interior and the exterior of the hose. The carrier pipe is inserted into the radially expanded hose, and the radially expanded hose is attached to the outside surface of the carrier pipe by reducing the pressure difference.

5 Claims, 2 Drawing Sheets

U.S. PATENT DOCUMENTS

| | | |
|---|---|---|
| 4,997,360 A | 3/1991 | Okamoto et al. |
| 2007/0119238 A1 | 5/2007 | Issel |

FOREIGN PATENT DOCUMENTS

| | | | |
|---|---|---|---|
| DE | 3434323 | A1 | 3/1986 |
| DE | 4222817 | * | 1/1993 |
| DE | 68920621 | T2 | 8/1995 |
| DE | 10009528 | C2 | 9/2001 |
| DE | 10239103 | A1 | 3/2004 |
| DE | 102005007988 | A1 | 8/2006 |
| EP | 0175219 | A1 | 3/1986 |

* cited by examiner

# METHOD FOR THE PRODUCTION OF A COLLECTING LINE FOR DETECTING AND LOCATING AN AGENT DISCHARGING INTO THE ENVIRONMENT OF THE COLLECTING LINE IN CASE OF LEAKAGE

CROSS-REFERENCE TO RELATED APPLICATIONS

This is a continuation, under 35 U.S.C. §120, of copending international application PCT/EP2008/000269, filed Jan. 16, 2008, which designated the United States; this application also claims the priority, under 35 U.S.C. §119, of German patent application DE 10 2007 005 693.3, filed Feb. 6, 2007; the prior applications are herewith incorporated by reference in their entirety.

BACKGROUND OF THE INVENTION

Field of the Invention

The invention relates to a method for producing a collecting line for detecting and locating an agent discharging into the environment of the collecting line from a plant component, for example a pipeline, in the case of leakage, such as is known for example from European patent EP 0 175 219 B1, corresponding to U.S. Pat. No. 4,735,09.

The collecting line known from European patent EP 0 175 219 B1 is formed of a carrier pipe which is provided on its outer surface with a permeable layer or sheath through which an agent, which discharges from a leak in the plant, for example a pipeline, into the environment of the collecting line and is to be detected, can diffuse. The carrier pipe is impermeable for this agent. Its wall is provided with openings, so that the agent passing through the permeable layer can enter the interior of the collecting line through these openings. A method known from German patent DE 24 31 907 C3, corresponding to U.S. Pat. No. 3,977,233, is then used to determine the location at which the agent has infiltrated the collecting line. This location corresponds to the point at which the agent was discharged from the monitored plant component. For this purpose, a pump connected to the collecting line is used to feed the agent which has infiltrated the collecting line, together with a carrier gas located in the collecting line, to a sensor which is also connected to the collecting line. If the flow speed is known, it is possible to determine from the time span between the switching-on of the pump and the arrival of the agent at the sensor the location at which the agent infiltrates the collecting line, and thus the location of the leak on the plant component.

In this case, in a large number of applications, ethylene vinyl acetate (EVA), which is for example applied in an extrusion process to the carrier pipe made of PVC, has proven particularly suitable as the material for the permeable layer. However, in practice, applications occur, for example extreme ambient conditions or the detection of specific agents, necessitating the use, for the permeable layer, of materials which cannot easily be thermoplastically processed and attached to a carrier pipe. Thus, for example, the use of EVA as the permeable layer is problematic under ambient conditions in which very low temperatures can occur, such as is the case for example in the detection of oil pipelines laid above ground in arctic or subarctic regions. That is to say, it has been found that the rate of diffusion of the agents to be detected through an EVA wall falls significantly with temperature and in practice limits the range of use of EVA as the permeable layer of a collecting line of this type at temperatures above 0° C. Under these ambient conditions and for the agents to be detected in this case, silicone rubber has in particular been found to be suitable as the material for the permeable layer. However, the application of silicone rubber to a long carrier pipe made of a thermoplastic having a relatively low melting or softening temperature, for example PVC, is a considerable problem in terms of production.

A device for applying resilient hose portions to cylindrical lines is known from German patent DE 100 09 528 C2. For this purpose, hose portions are first placed into a tool. Afterwards, compressed air is applied to a double-walled pipe and this pipe is passed through the hose portions located in the tool. Subsequently, the line to be sheathed is inserted through this pipe and the pipe then re-extracted from the tool. The hose portions are thus attached to the line at the correct position. However, as a result of the use of the tool and the additional pipe to which compressed air is applied, this method is complex and requires a large number of operations.

SUMMARY OF THE INVENTION

It is accordingly an object of the invention to provide a method for the production of a collecting line for detecting and locating an agent discharging into the environment of the collecting line in case of leakage, and a collecting line produced by this method which overcome the above-mentioned disadvantages of the prior art methods and devices of this general type, with which it is possible in a particularly efficient manner to sheath or to coat a carrier pipe even with materials which cannot be thermoplastically processed easily and at low temperatures. The invention is also based on the object of disclosing a collecting pipe produced by this method.

In the case of the method for the production of a collecting line for detecting and locating an agent discharging into the environment of the collecting line in the case of leakage, the collecting line contains a carrier pipe, the wall of which is provided with openings which are sealed by a resilient material which is permeable for the agent. The method steps include:

a1) a hose, which is made of the permeable resilient material and the inside diameter of which is the same size as or smaller than the outside diameter of the carrier pipe, is resiliently expanded, at least over a portion of its length, by generating a difference in pressure between the interior and the exterior of the hose, in that a2) the hose is introduced into a mounting device which is double-walled at least over a portion of its length and has a hollow cylindrical mounting pipe, a3) the mounting pipe is surrounded by an outer pipe set radially apart therefrom, has an inside diameter which is larger than the outside diameter of the hose when relaxed, and communicates via a plurality of openings arranged on its circumference with a chamber which is located between the mounting pipe and the outer pipe, surrounds the mounting pipe and extends in the longitudinal direction, a4) at least one vacuum pump is connected to the chamber, b) the hose is placed tightly at its ends against the mounting device in such a way that the hollow space, which is located between the hose and the mounting pipe and communicates with the chamber, is outwardly tightly sealed, c) the chamber is evacuated to generate the reduced pressure, d) the carrier pipe is introduced into the radially expanded hose, and e) the radially expanded hose is placed against the outer surface of the carrier pipe by reducing the difference in pressure.

As a result of this measure, the hose adheres to the outer surface of the carrier pipe with frictional engagement. The frictional engagement is additionally increased if the inside diameter of the relaxed, force-free hose, preferably a hose consisting of silicon rubber, is smaller than the outside diameter of the carrier pipe. In this case, the hose is additionally resiliently braced to the carrier pipe.

The number of required openings depends on the length of the mounting device and the resilience properties of the hose and must be configured so as to allow the hollow space to be evacuated uniformly over its entire length in order to avoid the production of non-evacuated, bag-like zones. As a result, this configuration of the method is particularly suitable for long mounting devices.

In order to facilitate the introduction of the carrier pipe, the inside diameter of the hose when expanded is larger than the outside diameter of the carrier pipe. In addition, it is possible to apply a lubricant, for example talc, which is used to reduce the friction between the hose and carrier pipe.

These measures make it possible to produce a collecting line, wherein the carrier pipe surrounded by a hose which tightly seals the openings. The hose is made of a resilient semipermeable material, and rests with frictional engagement against the outer surface of the carrier pipe, in particular is braced resiliently therewith in the circumferential direction and is made preferably of a silicone rubber.

Other features which are considered as characteristic for the invention are set forth in the appended claims.

Although the invention is illustrated and described herein as embodied in a method for the production of a collecting line for detecting and locating an agent discharging into the environment of the collecting line in case of leakage, and a collecting line produced by this method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
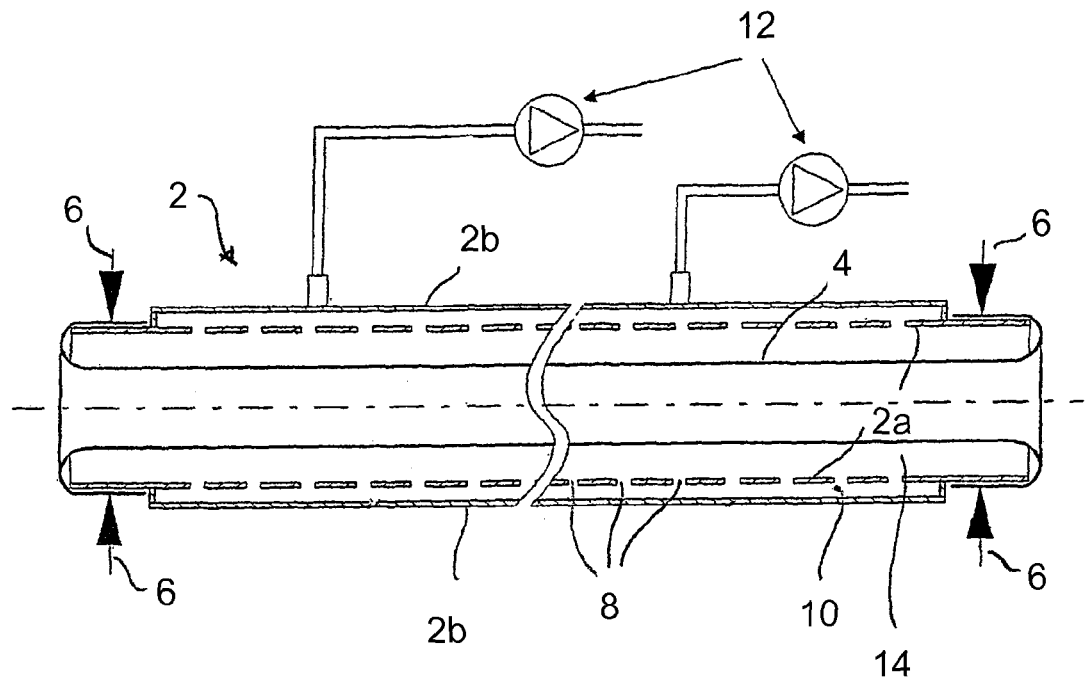
FIGS. 1 to 4 are diagrammatic, sectional view of a double-walled mounting device for explaining a sequence of a method according to the invention.

Referring now to the figures of the drawing in detail and first, particularly, to FIG. 1 thereof, there is shown a hose 4, which is made of a resilient material, in particular silicone rubber, and provided as the sheath or coating of a carrier pipe, is introduced into a double-walled mounting device 2 formed of a hollow cylindrical mounting pipe 2a and an outer pipe 2b and connected in a vacuum-tight manner to the mounting device 2 at the ends thereof. An outside diameter of the hose 4 when relaxed, i.e. when no axial or radial forces are exerted thereon, is smaller than the inside diameter of the mounting pipe 2a. In the exemplary embodiment, the hose 4 is for this purpose turned inside-out at the ends of the mounting device 2 and, as is indicated by arrows 6, fixed to the overhanging mounting pipe 2a by a hose clamp. The mounting pipe 2a is provided, at least over a portion of its length, with a plurality of openings or perforations 8 which are distributed uniformly over its circumference and via which it communicates with a chamber 10 which is formed between the inner pipe 2a and the outer pipe 2b and surrounds the mounting pipe 2a in the region of the openings 8. In the exemplary embodiment, the outer pipe 2b is connected in a vacuum-tight manner at its end sides to the mounting pipe 2a. However, a vacuum-tight connection of this type is not required if the outer pipe 2b is guided up to the end side of the mounting pipe 2a and the hose 4 is placed around the outer pipe 2b in a vacuum-tight manner.

The outer pipe 2b is preferably hollow cylindrical in order to generate a distribution of pressure which is as uniform as possible over the circumference of the inner pipe 2a. However, in principle, the geometric shape of the outer pipe is not restricted to a cylindrical geometry.

A plurality of vacuum pumps 12, via which it is possible uniformly to evacuate a hollow space 14 formed between the outer pipe 2b and hose 4, are connected to the chamber 10.

Figure 2:
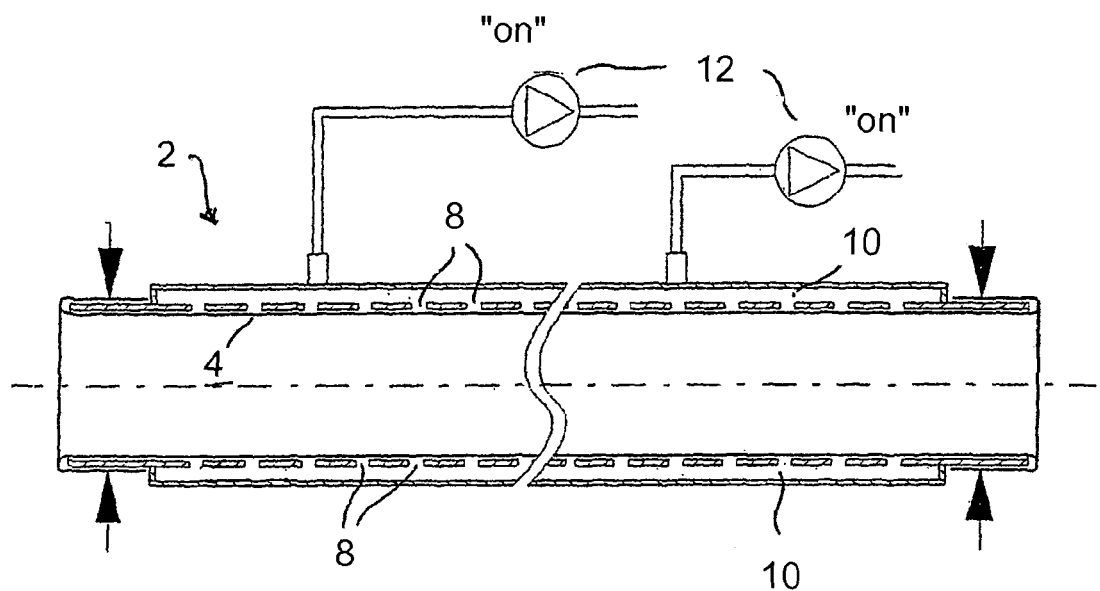

FIG. 2 illustrates the situation which occurs during evacuation of the hollow space 14. As a result of the difference in pressure, which is formed when the vacuum pumps 12 are switched on ("on"), between the interior of the hose 4, in which the ambient pressure generally prevails, and the exterior, formed by the chamber 10 or the hollow space 14, of the hose 4, the hose 4 is radially expanded and rests against the inner surface of the mounting pipe 2a. The distance between the openings 8 and also their width have in this case dimensions such that the hose 4 rests uniformly against the inner surface of the mounting pipe 2a, without being drawn into the openings 8.

Figure 3:
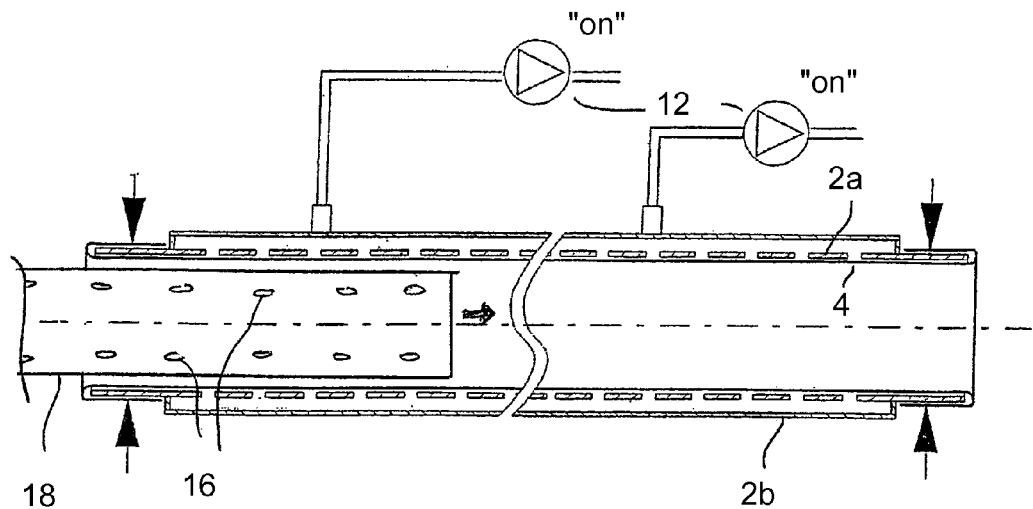
Figure 4:
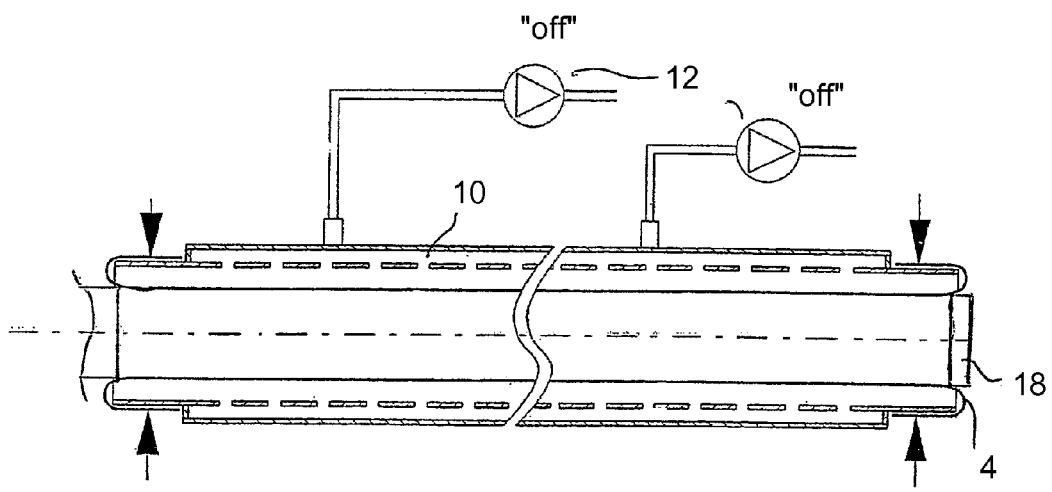

Once the hose 4 has been resiliently expanded, a carrier pipe 18, which is to be provided with the sheath or coating and is provided on its wall with a large number of openings 16, is now introduced into the hose 4. Subsequently, according to FIG. 4, the chamber 10 is ventilated (vacuum pumps 12 "off") and the hose 4, which in the relaxed, force-free state has an inside diameter which is the same size as or smaller than the outside diameter of the carrier pipe 18, is placed against the outer surface of the carrier pipe 18. The hose 14 is fixed axially and with frictional engagement in the circumferential direction to the outer surface of the carrier pipe 18, braced resiliently thereto in the circumferential direction, if its inside diameter in the relaxed, force-free state is smaller than the outside diameter of the carrier pipe 18, and seals in this case the openings 16 located in the carrier pipe 18 according to FIG. 3.

The sheath is manufactured in this case, in a correspondingly long mounting device 2, in a single production step. However, in principle, it is also possible to provide a very long carrier pipe 18 with the sheath in a stepwise manner in that the carrier pipe 18 is completely extracted from the mounting device 2 after a coating process. Subsequently, a new hose 4 is inserted into the mounting device 2 and expanded. In a subsequent step, the carrier pipe 18 is slid through the mounting device 2 until the portion which adjoins the previously sheathed portion and has not yet been provided with the sheath is located within the mounting device 2, so that certain portions of the sheaths either overlap or abut one another.

The invention claimed is:
1. A method for producing a collecting line for detecting and locating an agent discharging into an environment of the collecting line in a case of leakage, the collecting line containing a carrier pipe having a wall with a plurality of open- ings formed therein, the openings being sealed by a resilient material being permeable for the agent, which comprises the steps of:

resiliently expanding a hose, at least over a portion of a length of the hose, the hose being made of a permeable resilient material and having an inside diameter being a same size as or smaller than an outside diameter of the carrier pipe, by generating a difference in pressure between an interior and an exterior of the hose by the further steps of:

introducing the hose into a mounting device being double-walled at least over a portion of a length of the mounting device and the mounting device having a hollow cylindrical mounting pipe, the cylindrical mounting pipe being surrounded by an outer pipe set radially apart therefrom and having an inside diameter being larger than an outside diameter of the hose when relaxed, the cylindrical mounting pipe communicating, via a plurality of openings disposed on a circumference of the cylindrical mounting pipe, with a chamber disposed between the cylindrical mounting pipe and the outer pipe, the outer pipe surrounding the cylindrical mounting pipe and extending in a longitudinal direction;

connecting at least one vacuum pump to the chamber;

placing the hose tightly at its ends against the mounting device such that a hollow space, disposed between the hose and the mounting pipe and communicates with the chamber, is outwardly tightly sealed;

evacuating the chamber for generating a reduced pressure;

introducing the carrier pipe into the hose being a radially expanded hose; and placing the radially expanded hose against an outer surface of the carrier pipe by reducing a difference in pressure.

2. The method according to claim 1, wherein the inside diameter of the hose when expanded is larger than the outside diameter of the carrier pipe.

3. The method according to claim 1, which further comprises resiliently bracing the hose to the carrier pipe in a circumferential direction.

4. The method according to claim 1, which further comprises forming the hose from silicone rubber.

5. A method for producing a collecting line for detecting and locating an agent discharging into an environment of the collecting line in a case of leakage, which comprises the steps of:

resiliently expanding a hose, at least over a portion of a length of the hose, the hose being made of a permeable resilient material and having an inside diameter being a same size as or smaller than an outside diameter of the carrier pipe, by generating a difference in pressure between an interior and an exterior of the hose by the further steps of:

introducing the hose into a mounting device being double-walled at least over a portion of a length of the mounting device and the mounting device having a hollow cylindrical mounting pipe, the cylindrical mounting pipe being surrounded by an outer pipe set radially apart therefrom and having an inside diameter being larger than an outside diameter of the hose when relaxed, the cylindrical mounting pipe communicating, via a plurality of openings disposed on a circumference of the cylindrical mounting pipe, with a chamber disposed between the cylindrical mounting pipe and the outer pipe, the outer pipe surrounding the cylindrical mounting pipe and extending in a longitudinal direction;

connecting at least one vacuum pump to the chamber;

placing the hose tightly at its ends against the mounting device such that a hollow space, disposed between the hose and the mounting pipe and communicating with the chamber, is outwardly tightly sealed;

evacuating the chamber for generating a reduced pressure;

introducing the carrier pipe into the hose being a radially expanded hose; and reducing a difference in pressure for placing the radially expanded hose against an outer surface of the carrier pipe and to thereby produce a collecting line for detecting and locating an agent discharging into an environment of the collecting line in a case of leakage, the collecting line including the carrier pipe with plurality of openings formed therein, and the openings being sealed by the hose forming a resilient material that is permeable to the agent.

* * * * *